United States Patent [19]
Colanzi et al.

[11] Patent Number: 4,733,978
[45] Date of Patent: Mar. 29, 1988

[54] CONTACT TYPE FLEXIBLE SEAL FOR BEARINGS

[75] Inventors: Franco Colanzi; Angelo Vignotto, both of Turin, Italy

[73] Assignee: RIV-SKF Officine di Villar Persoa S.p.A., Turin, Italy

[21] Appl. No.: 867,579

[22] Filed: May 28, 1986

[51] Int. Cl.$^4$ .......................... F16C 33/76; F16J 15/34
[52] U.S. Cl. ..................................... 384/482; 384/484; 277/94
[58] Field of Search ............... 384/130, 139, 140, 147, 384/151, 153, 477, 481, 482, 484–486, 607; 277/84, 94, 35, 50

[56] References Cited

U.S. PATENT DOCUMENTS

| | | | |
|---|---|---|---|
| 3,572,857 | 3/1971 | Hasegawa | 277/94 X |
| 4,304,412 | 12/1981 | Ladin | 384/486 X |
| 4,505,484 | 3/1985 | Ohkuma et al. | 384/486 X |

FOREIGN PATENT DOCUMENTS 1169214 4/1964 Fed. Rep. of Germany ........ 277/94

Primary Examiner—David Werner
Attorney, Agent, or Firm—Eugene E. Renz, Jr.

[57] ABSTRACT

A sealing system for sealing the space between relatively rotatable members comprising a rigid support element and an annular elastomeric sealing element having an internal radial annular lip extending radially and axially from an annular root portion of the elastomeric element. The annular lip has a radial section of generally V-shaped cross section, having its vertex located obliquely with respect to the axis of the elastomeric element and comprising two portions of reduced cross section, one of the portions corresponding to the root portion and the other to the vertex of the V. Portions of reduced cross section divide the annular lip into first and second sections operable to engage with corresponding sealing surfaces on one of the members and having sufficient flexibility to hingedly connect the sections to one another and to the root portion.

3 Claims, 2 Drawing Figures

CONTACT TYPE FLEXIBLE SEAL FOR BEARINGS

FIELD OF THE INVENTION

The present invention relates to improvements in seals for bearings, and particularly to contact lip sealing systems.

BACKGROUND OF THE INVENTION

Presently known contact lip sealing systems used on rolling bearings have certain disadvantages and drawbacks. In general it has been observed that their efficiency depends on the accuracy with which the system has been installed in a seat formed in the bearing rings and on the precision with which the seat is constructed. In most of these systems, sealing is effected by one or more contact-type, flexible lip seals which interact with the seating surfaces of the sealing systems in such a way as to be elastically deformed and consequently exert on the surfaces a pressure which is sufficient to ensure sealing. Accordingly, if the seal is installed improperly or if the seat is not constructed precisely, the interaction between the flexible lips and the seating surfaces will not provide the desired sealing effectiveness. These conditions may also provide an undesirable decrease in bearing/grease life due to temperature increase as a consequence of excessive friction at the lip contacts, that is a greater force interaction than designed or desired.

SUMMARY OF THE INVENTION

With the foregoing in mind, a principal object of the present invention is to provide a sealing system of the contact lip type characterized by novel features of construction and arrangement wherein the sealing effectiveness and operating wear are independent of the precision with which the sealing system is installed in its operating seat and of the precision with which the seat is constructed. To this end, in accordance with the present invention, a sealing system is provided particularly adapted for rolling bearings which is adapted to be interposed between two relatively rotatable elements to ensure a fluid-tight seal in the annular space between the rotating elements. The seal comprises an essentially rigid support element and a sealing element made of an elastomeric material including an annular lip portion extending radially and axially from an annular root portion. The seal, in accordance with the present invention, is characterized by a radial section of generally V-shaped cross section having its vertex situated obliquely with respect to the axis of the elastomeric element and wherein the annular lip comprises two portions of reduced thickness, one portion corresponding to the root section and a second portion corresponding to the vertex of the radial V-shaped section. These portions are of reduced cross section and subdivide the annular lip into first and second sections capable of engaging with corresponding sealing surfaces on one of the rotatable members and have sufficient flexibility to connect the sections to one another and to the root section much in the nature of elastic hinges.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENT

Figure 1:
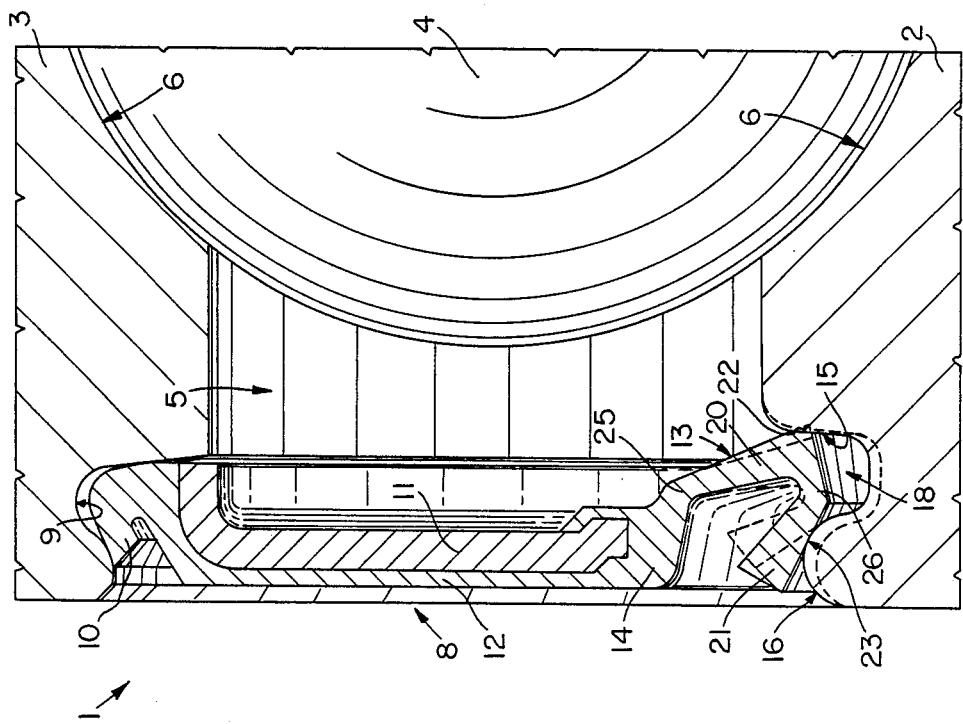
FIG. 1 is a fragmentary sectional view of a roller bearing incorporating a sealing means in accordance with the present invention.

Referring now to the drawings and particularly to FIG. 1 thereof, there is illustrated a rolling bearing generally designated by the numeral 1 which comprises the usual inner and outer rings 2, 3 respectively and a plurality of rolling elements in the present instance balls 4 engaging in the annular space 5 between the rings. The rings are provided with the usual raceway 6.

In accordance with the present invention, seal means is provided for sealing the annular space 5 generally designated by the numeral 8. In the present instance, the outer ring 3 is provided with an annular seat 9 to receive an elastic lip 10 of the seal 8. The seal 8 comprises, as illustrated, an essentially rigid support frame element 11 preferably made of metal or a rigid plastic material and a sealing element 12 made of an elastomeric material such as rubber integrally connected to the rigid support element 11. These elements are preferably molded together or may be attached intimately as a unit with no break in continuity by adhesion during the vulcanization phase of making the seal.

As illustrated, the elastomeric sealing element 12 is annular in shape and has an inner annular sealing lip 13 which projects radially and axially from an annular root section 14 representing the inner periphery of the sealing element 12. The sealing lip 13 engages sealing surfaces 15, 16 on a circumferentially extending seat 18 formed on the inner ring 2.

The sealing lip 10 is formed as a unitary extension of the casing element 12 in an outward direction. Note also that lip 13 projects inwardly forming an integral extension of the casing 12. Further, lip 10 is located peripherally on the outside of the sealing system 8 so that it serves not only as an element for dovetailing the latter into bearing 1 but also for exerting on seat 9 a sealing effect between ring 3 and elements 11, 12.

In accordance with the present invention, the lip 13 is of a predetermined configuration so that it operates to provide a double sealing effect when engaged in seat 18, that is sealing in both the radial and axial directions. In prior known sealing systems typically separate and distinct sealing lips were needed to achieve double sealing in the axial and radial direction. Thus, the lip 13, in accordance with the present invention, is of a configuration to define a toroidal bellows element and has a radial cross section which, as illustrated, is essentially V-shaped so that its vertex is disposed obliquely with respect to the axis of the annular element 12.

The toroidal element consists of two opposing annular concical sections 20, 21 having concordant but different angles of taper and disposed coaxially, one within the other, along the perimeter of their minor base portions. These define in cross section the vertex of the V-shaped bellows. Annular conical sections 20, 21 have in the vicinity of the vertex and on opposite sides with respect to the latter a sealing edge 22 and a flat sealing surface 23 capable of engaging sealing surfaces 15, 16 on seat 18 in a fluid tight manner. More specifically, edge 22 has the capability of engaging axially by friction and by interaction with surface 15 which as illustrated is oblique to the axis of the bearing 1 whereas surface 23 is capable of engaging in the radial direction with surface 16 which is curved and defines in radial cross section an arc of a circle along which sections 21 can move in a predetermined manner. By this arrangement, section 21 defines together with seat 18 and depending on the profile of surface 16, a contact-type radial interference seal (shown in solid lines in FIG. 1) or a radial non-contact labyrinth seal (as indicated in borken lines in FIG. 1).

Figure 2:
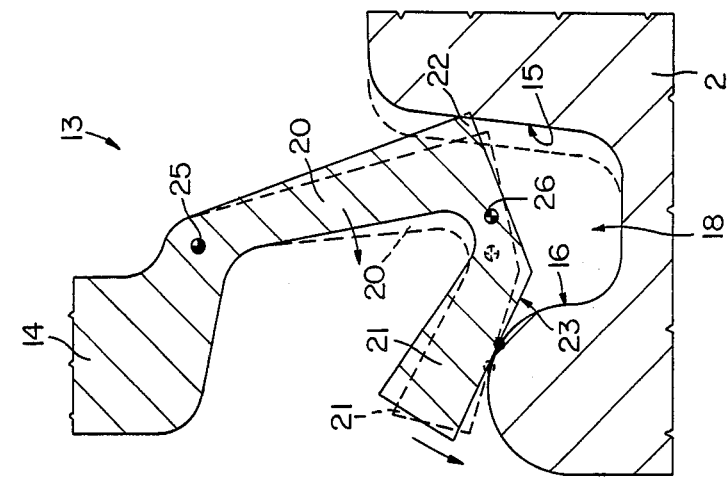
FIG. 2 is an enlarged sectional view showing the assembly of the seal.

As best illustrated in FIG. 2, the sealing lip 13 comprises two annular portions 25, 26 of reduced cross section located at the root portion 14 and at the vertex of the V defined in the radial cross section of lip 13 thereby dividing lip 13 into the conical sections 20, 21. By this configuration, the annular portions have sufficient flexibility to connect sections 20, 21 to each other and to root portion 14 so that they function essentially as an elastic hinge. In essence, the portions with reduced thickness 25, 26 of elastomeric lip 13 are capable of functioning as constraining fulcrums connecting sections 20, 21 (indicated by the two circles in FIG. 2) so as to permit relative rotation between sections 20 and 21 as a consequence of stresses exerted even only on one of the two. Specifically, lip 13 extends outwardly from portion 14 of the part of section 20 which is of a predetermined configuration so that it always engages in interaction with seat 18. Accordingly, as a result of rotation of section 20 in the direction of the arrow (FIG. 2) around the pivot point represented by area 25 resulting, for example, from elastic deformation created after installation between edge 22 and surface 15, section 21 rotates in the opposite direction about the pivot represented by area 26 so that the surface 23 is forced to move along an arc of a circle following axial displacement of edge 22. In operation, therefore, whatever the degree of interaction between edge 22 and surface 15 of seat 18, wherein lip 13 remains undeformed, the degree of interaction between surfaces 16, 23 (where the distance between them in the case of a labyrinth seal) will remain constant by reason of the fact that as soon as edge 22 touches surface 15 during assembly, lip 13 deforms elastically by rotation of section 20 and by consequent rotation of the section around area 26 along an arc of a circle parallel to that defined in section by surface 16. It follows, therefore, that the contact pressure between lip 13 and seat 18 always remains constant irrespective of the relative axial position between system 8 and seat 18 and notwithstanding, assembly errors, for example, or errors in the shape of seat 18. Furthermore, if edge 22 does not engage with surface 15 as a result, for example, of installation or machining errors, the sealing of assembly 1 is not compromised for the reason that even if the degree of axial sealing is reduced, radial sealing is still effected between sections 21 and surface 16.

Even though a particular embodiment of the present invention has been illustrated and described herein, it is not intended to limit the invention and changes and modifications may be made therein within the scope of the following claims. Further, even though the above description of the invention is shown in connection with a bearing application, the invention has useful applications in other fields. For example, in more general terms it is clear that the sealing system of the present invention can be placed between any two members or units rotating relative to one another such as a shaft in its mounting to produce the functional advantages described above.

What is claimed is:

1. A sealing device for sealing the space between relatively rotatable members comprising a rigid support element and an annular elastomeric sealing element having an internal radial annular lip extending radially and axially from an annular root portion of said elastomeric element, said annular lip having a radial section of generally V-shaped cross section with a vertex located obliquely with respect to said annular root portion of the elastomeric element and said annular lip comprising a first and a second portion of reduced cross section, said first portion corresponding to said root portion and said second portion to said vertex of the V-shaped cross section, said first and second portions of reduced cross section dividing said annular lip into first and second sections operable to engage with corresponding first and second sealing surfaces on one of said members and having sufficient flexibility to hingedly connect said sections to one another and to said root portion, said first section being tapered and extending between said root portion and said vertex and said second section being tapered and extending upwardly from said vertex.

2. A sealing device according to claim 1, characterized in that said annular lip is of a predetermined configuration to produce, following the rotation of said first section about said first portion wtih reduced thickness, a rotation in the opposite direction of said second section about said second portion of reduced thickness, so as to make a radial sealing surface of said lip located on said second section move along an arc of a circle defined by the first one of said sealing surfaces.

3. A sealing device according to claim 1, characterized in that said first section of said annular lip is provided in the vicinity of said vertex of the V-shaped cross section with a sealing edge capable of engaging axially by contact and by interaction with the second one of said sealing surfaces.

* * * * *